UNITED STATES PATENT OFFICE.

OTTO ERNST AND HEINRICH EICHWEDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MONOAZO DYESTUFF AND PROCESS OF MAKING SAME.

983,486.     Specification of Letters Patent.     Patented Feb. 7, 1911.

No Drawing.     Application filed May 25, 1910. Serial No. 563,328.

*To all whom it may concern:*

Be it known that we, OTTO ERNST, Ph. D., chemist, and HEINRICH EICHWEDE, Ph. D., chemist, citizens of the Empire of Germany, residing at Höchst-on-the-Main, Germany, have invented certain new and useful Improvements in Monoazo Dyestuffs and Processes of Making the Same, of which the following is a specification.

In U. S. Patent No. 733,280 of 1903 is described a monoazo dyestuff produced by combining the diazotized 5-amino-2-chloro-1-toluene-4-sulfonic acid with $\beta$-naphthol. This dyestuff yields color-lakes of a yellowish-red shade and of remarkable fastness to light. We have now found, that by substituting in the manufacture of this dyestuff $\beta$-oxynaphthoic acid of melting point 216° for the $\beta$-naphthol, a product is obtained possessing more valuable properties than the dyestuff derived from the combination with $\beta$-naphthol. In the first place, the shade of the color-lakes produced from the new dyestuff has a bluer hue and is exceedingly pure and bright. Furthermore, by substituting the $\beta$-oxynaphthoic acid for the $\beta$-naphthol, the fastness of the new dyestuff to light is greatly enhanced so that the invention of this dyestuff constitutes a great technical advance as compared with the combination described in U. S. Patent No. 733,280.

In carrying out the new process we can proceed as follows: 22.15 parts by weight of the aforesaid chlorotoluidin-sulfonic acid are converted in the usual manner into the diazo-compound which, for the most part, separates upon its formation. This suspension of the diazo-sulfonic acid is run into a solution of 20 parts of $\beta$-oxynaphthoic acid of melting point 216° together with 26 parts of calcined soda in the necessary quantity of water, whereupon nearly the whole of the dyestuff separate. The mass is then gently heated for some time and a small quantity of a saturated solution of common salt is added to it in order to completely separate the dyestuff. The finely divided dyestuff is of a bright-red color. Of course, the preparation of the dyestuff and its conversion into color-lakes may be carried out in a single operation by adding to the liquids to be combined a substratum or a precipitating agent, such as barium-chlorid, strontium-chlorid or the like, or by first forming the free acid of the dyestuff according to the method considered to be suitable for the preparation of the color-lakes. In this operation as well as in the subsequent transformation of the dyestuff into lakes, Turkey-red oil or some similar fixing agent may be used.

Having now particularly described our invention, what we claim is:

1. The process of manufacturing a red monoazo dyestuff, which consists in combining the 5-diazo-2-chloro-toluene-4-sulfonic acid with $\beta$-oxynaphthoic acid of melting point 216°.

2. As a new product, the monoazo dyestuff, obtainable from 5-diazo-2-chloro-toluene-4-sulfonic acid by combining it with $\beta$-oxynaphthoic acid of melting point 216°, being, in form of its sodium salt, when dry, a red powder, insoluble in alcohol, but dissolving in water with a yellowish-red color, from which solution the dyestuff is precipitated as a dark-red precipitate by means of mineral acids; yielding bright-red color-lakes of great fastness to light.

In testimony whereof, we affix our signatures in presence of two witnesses.

OTTO ERNST.
    HEINRICH EICHWEDE.

Witnesses:
    JEAN GRUND,
    CARL GRUND.